(12) United States Patent
Zumkeller et al.

(10) Patent No.: US 7,702,085 B2
(45) Date of Patent: Apr. 20, 2010

(54) DYNAMIC FD COEXISTENCE METHOD FOR PLC SYSTEMS

(75) Inventors: Markus Zumkeller, Schwaikheim (DE); Andreas Schwager, Fellbach (DE); Lothar Stadelmeier, Stuttgart (DE); Stephen Tiedemann, Stuttgart (DE); Gralf Gaedeken, Weinsberg (DE)

(73) Assignee: Sony Deutschland GmbH, Cologne (DE)

( * ) Notice: Subject to any disclaimer, the term of this patent is extended or adjusted under 35 U.S.C. 154(b) by 1048 days.

(21) Appl. No.: 11/239,893

(22) Filed: Sep. 30, 2005

(65) Prior Publication Data

US 2006/0073805 A1    Apr. 6, 2006

(30) Foreign Application Priority Data

Oct. 4, 2004    (EP)    ................... 04023603

(51) Int. Cl.
H04M 11/00    (2006.01)
(52) U.S. Cl. .................................. 379/90.01
(58) Field of Classification Search ............. 379/90.01; 375/260; 340/310.12, 310.13, 310.16
See application file for complete search history.

(56) References Cited

U.S. PATENT DOCUMENTS

| | | | |
|---|---|---|---|
| 3,943,296 A | 3/1976 | O'Neill | |
| 4,479,215 A | 10/1984 | Baker | |
| 6,249,213 B1 | 6/2001 | Horne | |
| 6,363,183 B1 | 3/2002 | Koh | |
| 6,417,762 B1 * | 7/2002 | Comer | 375/260 |
| 2002/0196732 A1 | 12/2002 | Mestdagh | |
| 2004/0023678 A1 | 2/2004 | Fredriksson | |

FOREIGN PATENT DOCUMENTS

| | | |
|---|---|---|
| DE | 100 26 930 | 12/2001 |
| EP | 1 014 640 | 6/2000 |
| GB | 1 337 180 A | 11/1973 |
| GB | 2 034 944 A | 6/1980 |
| GB | 2 106 285 A | 4/1983 |
| GB | 2 112 973 A | 7/1983 |
| GB | 2 358 563 A | 7/2001 |
| GB | 2 383 724 | 7/2003 |
| WO | WO 89/02685 A1 | 3/1989 |

(Continued)

OTHER PUBLICATIONS

Chinese First Office Action dated Nov. 27, 2009 in U. S. Appl. No. 200580033798, pp. 1-22, submitted by Applicant.*

(Continued)

*Primary Examiner*—Stella L Woo
(74) *Attorney, Agent, or Firm*—Oblon, Spivak, McClelland, Maier & Neustadt, L.L.P.

(57) ABSTRACT

A power line communication method is provided for realizing data communication between at least one first or sending power line communication partner device (P1) and at least one second or receiving power line communication partner device (P10). The inventive method comprises a step of checking transmission conditions of a plurality of possible communication channels (Ch1, . . . , Chn). Thereby generating transmission condition data which are descriptive for the communication conditions of the respective possible communication channels (Ch1, . . . , Chn). Additionally, a step of selecting communication conditions of the plurality of possible communication channels (Ch1, . . . , Chn) as actual communication conditions based on said transmission condition data.

18 Claims, 10 Drawing Sheets

FOREIGN PATENT DOCUMENTS

| WO | WO 89/04093 A1 | 5/1989 |
|---|---|---|
| WO | WO 99/25075 A2 | 5/1999 |
| WO | WO 01/65703 | 9/2001 |
| WO | WO 02/25859 A1 | 3/2002 |
| WO | WO 02/102102 A1 | 12/2002 |
| WO | WO 03/013048 A2 | 2/2003 |

OTHER PUBLICATIONS

Halldorsson U R et al: "Modulation Fuer Powerline" Funkschau, Franzis-Verlag K.G. Munchen, DE, vol. 71, No. 6, Mar. 6, 1998, pp. 56, 58-61, XP000774732.

"What is Powerline Communication? What are the advantages?" Asoka USA - Powerline Communications (PLC) Network Solutions, p. 1 http://www.asokausa.com/knowledgebase/faq.php retrieved Sep. 9, 2004.

"Broadband over Power Line," pp. 1-2, http://searchnetworking.techtargetcom/sDefinition/0,,sid7_qci953137.00.html retrieved Aug. 19, 2004.

"Orthogonal Frequency-Division Multiplexing," pp. 1-2, http://searchnetworking.techtarget.com/sDefinition/0,,sid7_qci523666.00.html retrieved Aug. 19, 2004.

"Media Access Control Layer," pp. 1-2, http://searchnetworkingtechtarget.com/sDefinition/0,,sid_qci755784.00.html retrieved Aug. 19, 2004.

"MAC Address," pp. 1-2, http://searchnetworking.techtarget.com/sDefinition/0.,,sid7_qci212506.00.html retrieved Aug. 19, 2004.

\* cited by examiner

DYNAMIC FD COEXISTENCE METHOD FOR PLC SYSTEMS

BACKGROUND

The present invention relates to a power line communication method.

More particular, the present invention relates to a power line communication method for realizing data transmission or data communication between at least one first or sending power line communication partner device and at least one second or receiving power line communication partner device. More specifically, the present invention relates to a dynamic frequency domain or FD coexistence method for power line communication systems and/or to a dynamic time domain or TD coexistence method for power line communication systems.

Although in recent years wireless communication technologies became more and more important power line communication networks and power line communication systems are still of interest and they participate in certain technology strategies. However, achieving a high degree of reliability is still a major task in the development and progress of power line communication technology.

SUMMARY

It is an object underlying the present invention to provide a power line communication method in which disturbances of power line communication between power line communication partner devices by interferences from other power line communication systems or other systems or from noise sources can be reduced in a simple and reliable manner in order to increase the communication quality and the communication reliability as well as the data throughput possible via power line communication network strategies.

This object underlying the present invention is achieved by a power line communication method with the features of independent claim 1. The object is further achieved by a system for power line communication, a device for power line communication, a computer program product, and a computer readable storage medium according to independent claims 17, 18, 19, and 20, respectively.

The inventive method for power line communication is adapted in order to realize data communication between at least one first or sending power line communication partner device and at least one second or receiving power line communication partner device. The inventive method comprises a step (a) of checking transmission conditions of a plurality of possible communication channels between said at least one first or sending power line communication partner device and said at least one second or receiving power line communication partner device, thereby generating transmission condition data which are descriptive for the communication conditions of the respective possible communication channels. The inventive method further comprises a step (b) of selecting communication conditions of the plurality of possible communication channels as actual communication conditions based on said transmission condition data between said at least first or sending power line communication partner device and said at least one second or receiving power line communication partner device.

It is therefore a key idea of the present invention to monitor transmission conditions or receiving conditions of possible communication channels between power line communication partner devices between which a data communication or a data transmission shall be established or is in progress.

According to the present invention the transmission conditions are described by transmission condition data. Based on said transmission condition data communication conditions with respect to the plurality of possible communication channels are selected or chosen as actual communication conditions for the actual communication to be established or for the actual communication in progress. According to these measures the quality of data communication or data transmission between power line communication partner devices can be maintained or increased by selecting a communication channel or by choosing the communication conditions which make possible a high quality of data communication or data transmission.

Said transmission condition data may preferably be generated in order to describe at least one of the group comprising a signal to noise ratio, time slots, frequency bands, channel capacities, interference signals from power line communication partner devices of said power line communication system or of other systems of possible power line communication channels.

Alternatively or additionally, said actual communication conditions may be chosen in order to effect and select at least one of the group comprising a frequency band, a time slot, a signal modulation scheme and an emission power of a possible or said actual communication channel of the plurality of possible communication channels between said at least one first or sending power line communication partner device and said at least one second or receiving power line communication partner device.

Said step (a) of checking said transmission conditions may preferably be carried out repeatedly.

Additionally or alternatively, said step (a) of checking transmission conditions may be carried out during a process of data communication in progress between said at least one first or sending power line communication partner device and said at least one second or receiving power line communication partner device.

Said step (b) of selecting said communication conditions may preferably be carried out repeatedly.

Additionally or alternatively, said step (b) of selecting said communication conditions is carried out during a process of data communication and progress between said at least one first or sending power line communication partner device and said at least one second or receiving power line communication partner device, in order to change its communication conditions for maintaining or increasing the actual data communication quality of the data communication between said at least one first or sending power line communication partner device and said at least one second or receiving power line communication partner device in progress.

It may be of advantage that said actual communication conditions are chosen according to a given threshold criterion, in particular with respect to at least one of said transmission parameters.

Additionally or alternatively, said actual communication conditions may be chosen in order to realize a best data communication, in particular with respect to a given threshold criterion, in particular with respect to at least one of said transmission parameters.

Further, the signal emission for data communication between said at least one first or sending power line communication partner device and said at least one second or receiving power line communication partner device may be reduced or avoided by said at least one first or sending power line communication partner device for frequency bands in which said at least one second or receiving power lien communication partner device does not listen and/or in which foreign sending devices or noise are present.

Further advantageously, the signal emission power for data communication between said at least one first or sending power line communication partner device and said at least one second or receiving power line communication partner device may be set in order to fulfil given emission power limit requirements with respect to chosen emission frequency bands.

The data communication between said at least one first or sending power line communication partner device and said at least one second or receiving power line communication partner device may preferably be established according to a media access control or MAC structure.

A channel capacity may be evaluated according to Shannon's law and in particular according to the following formula (1):

$$C = \int_{t_{start}}^{t_{stop}} \int_{f_{start}}^{f_{stop}} ld(1 + SNR) df dt \qquad (1)$$

wherein C denotes the channel capacity, t denotes the time variable for data transmission, $t_{start}$ denotes the starting time, $t_{stop}$ denotes the stopping time, f denotes the frequency variable, $f_{start}$ denotes the starting frequency, $f_{stop}$ denotes the stopping frequency, $ld(\cdot)$ denotes the dual logarithmic function, and SNR denotes the respective signal-to-noise-ratio.

According to a further additional or alternate embodiment, for a plurality of time gaps with respective starting times $t_{start,1}, \ldots, t_{start,n}$ and stopping times $t_{stop,1}, \ldots t_{stop,n}$ fulfilling the conditions $t_{start,j} \leq t_{start,j+1}$, $t_{stop,j} \leq t_{stop,j+1}$, and $t_{start,j} < t_{stop,j}$ for $j=1, \ldots, n$ and/or for a plurality of frequency gaps with respective starting frequencies $f_{start,1}, \ldots f_{start,m}$ and stopping frequencies $f_{stop,1}, \ldots, f_{stop,m}$ fulfilling the conditions $f_{start,k} \leq f_{start,k+1}$, $f_{stop,k} \leq f_{stop,k+1}$, and $f_{start,k} < f_{stop,k}$ for $k=1, \ldots, m$ a full channel capacity $C_{full}$ may be evaluated according to the following formula (2a):

$$C_{full} = \sum_{j=1}^{n} \sum_{k=1}^{m} C_{j,k} \qquad (2a)$$

wherein $C_{j,k}$ denotes the partial channel capacity for the $j^{th}$ time gap and the $k^{th}$ frequency gap and is determined according to Shannon's law and in particular according to the following formula (2b):

$$C_{j,k} = \int_{t_{start,j}}^{t_{stop,j}} \int_{f_{start,k}}^{f_{stop,k}} ld(1 + SNR) df dt \qquad (2b)$$

wherein t denotes the time variable for data transmission, f denotes the frequency variable, $ld(\cdot)$ denotes the dual logarithmic function, and SNR denotes the respective signal-to-noise-ratio.

Thereby a TD approach with a plurality of time gaps with respective starting times $t_{start,1}, \ldots, t_{start,n}$ and stopping times $t_{stop,1}, \ldots, t_{stop,n}$ and/or a FD approach with a plurality of frequency gaps with respective starting frequencies $f_{start,1}, \ldots f_{start,m}$ and stopping frequencies $f_{stop,1}, \ldots f_{stop,m}$ is realized and the full available channel capacity or channel capability is the some of the respective partial channel capacities $C_{j,k}$.

Additionally or alternatively, a signal to noise ratio may be determined according to the following formula (3):

$$SNR = PSD_{feed} - ATT - NPSD_{receive} \qquad (3)$$

wherein SNR denotes the respective signal to noise ratio, $PSD_{feed}$ denotes the feeding power spectral density, which is in particular known to all modems, $NPSD_{receive}$ denotes the noise power spectral density at a receiver, which is in particular measured by the receiving power line communication partner device, and ATT denotes the attenuation of a signal, in particular between said first or sending power line communication partner device and said second or receiving power line communication partner device.

According to a further preferred embodiment of the inventive method for power line communication a plurality of power line communication systems may be managed, in particular each having a plurality of power line communication partner devices and/or each without inter system communication between each of said systems of said plurality of power line communication systems.

It is still a further aspect of the present invention to provide a power line communication system, which is adapted and/or arranged and which has means in order to realize the inventive method for power line communication.

It is still a further aspect of the present invention to provide a power line communication device which is adapted and/or arranged and which has means in order to realize and/or to participate a/two method for power line communication according to the present invention.

Also, a computer program product is provided according to the present invention which comprises computer means which is adapted and/or arranged in order to realize a method for power line communication according to the present invention and the steps thereof when it is executed on a computer, a digital signal processing means or the like.

Finally, a computer readable storage medium comprising a computer program product according to the present invention.

These and further aspects of the present invention will be further discussed in the following:

The present invention inter alia relates to a dynamic FD and/or TD coexistence method for power line communication system or PLC systems.

Power line networks are open networks. Signals from PLC system installed in adjacent flats may crosstalk to other PLC systems. Data—throughput of both systems is degraded due to this interference. This invention shows a method to share resources in Time and Frequency Domain that both systems do not interfere. Using this coexistence method, the total throughput of both systems is higher than if there is interference of the communication signals. There is no compatibility or data exchange needed between PLC systems.

Today, there is no coexistence present in PLC communication. PLC modems use permanent frequency allocations with maximum power possible. Signals of modems various vendors interfere and all systems have lower data throughput.

1 Time and Frequency Diversity for Known and Unknown Communication Systems in a Quasi Static Channel

1.1 Introduction

Power line networks are open networks. The wires inside a building are connected to the transformer station. Each transformer station is connected to many houses. Often houses are daisy chained along the overhead cabling. Even inside a building several flats or living units are connected in the meter room or fuse cabinet. PLC signals crosstalk from one living unit to another. The cross talking signals are attenuated by the power meters or the distance between the living units or the buildings. The longer the distance, the less is the risk of the interference of a communication. Statistically in most cases a connection from one outlet inside a living unit to another outlet in another living unit is more attenuated than a connection between two outlets inside a flat. But in a very few cases the opposite was found. For the interference cases, a coexistence mechanism is needed. Theoretically coexistence problems can be solved in Time or Frequency domain.

1.2 Scenario

For example inside Flat 1 there is a power line communication or PLC communication from P1 (Plug 1) to P10. In the adjacent Flat, there is a communication from P15 to P21. PLC communication system from Flat 2 interferes to the PLC system installed in Flat 1.

The current invention shows a mechanism, how to minimize the influence of interference between the two PLC systems that are based on the same or on different architecture.

1.3 General PLC System Targets

1. Two outlets that want to communicate to each other are making use of the best possible communication link in the time- and frequency-domain
2. The communication link between two outlets are occupying only the undisturbed capacity in frequency and time 1.4 Centralized Medium Access Control or MAC Overview The proposed invention is inter alia intended for centralized MAC architectures, where a central controller is responsible for the coordination of the time slot (channel) assignments for each MAC frame. A centralized MAC frame is typically divided into the following phases:

A broadcast phase where the central controller sends frame synchronization and resource allocation information (time slot or channel assignments) to the listening terminals.

A downlink phase where data is sent from the central controller to one or more of the listening terminals.

An uplink phase where terminals send data to the central controller.

Optionally, a direct link phase where terminals send data directly to other terminals.

A resource request phase where terminals may requests resource reservations in a random access fashion, i.e. all terminals content for the medium during this phase.

1.5 Adaptive OFDM Overview

According to a preferred embodiment of the present invention PLC may use adaptive modulation schemes according to the current channel conditions. OFDM as a modulation scheme that consists of many orthogonal sub-carriers might be extended in a way that each sub-carrier can be adapted to its channel characteristic: Sub-carriers with good conditions choose high modulation scheme, allowing a high bit rate throughput. Stib-carriers with bad conditions choose a more robust modulation scheme, resulting in a lower bit rate throughput. Moreover, sub-carriers with very bad conditions can be left out. FIG. 3 shows an example of available SNR in a PLC channel: The y-axis represents the available SNR, the x-axis the frequency. Frequencies with high SNR choose modulation up to 1024 QAM. Decreasing SNR results in more robust modulation schemes, down to QPSK or even BPSK. Areas with very low SNR are notched out.

1.6 Allocation of a Communication Link Between Two Outlets in a First Flat 1

A further embodiment of the invention my be realized at least in part according to the following processing steps:

1. P10 is monitoring the amplitude or field strength over the PLC frame period or the PLC MAC frame period within the frequency band, e.g. 4 MHz to 30 MHz. P10 detects the time slot which has minimum interferer.
2. P10 requests the data from P1 to be transmitted at the best time slot within one PLC frame. This may be coordinated by a master of centralized MAC.
3. P1 sends 1st initial data packet with robust modulation pattern at defined time slot to P10.
4. P10 defines the frequency dependent modulation pattern out of the received signal from P1 and the measured interferer and noise (SNR calculation).
5. P10 requests data as ongoing payload from P1 with specific modulation pattern at specific time slot within the PLC frame.
6. P1 sends data to P10 with requested modulation pattern.

If P10 detects difficulties in time or frequency with the received data from P1, immediate retransmission will be requested at higher layer. Then P10 requests further data at a new timeslot within the PLC frame and/or with a new modulation pattern from P1.

1.7 Case 1: PLC System of a Second Flat 2 is a Fully Unknown Interferer

There is only limited gain from changing the time slot because time selective interferers (transmission from P15 to P21) are difficult to predict. However there is a good chance to avoid this interfere at least for some time.

1.8 Case 2: PLC System of a Second Flat 2 is a Known PLC Interferer, e.g. a PLC System with the Same System Architecture as the PLC System in a First Flat 1

Changing the time slot provides a big advantage even if the two PLC systems are of first and second flats 1 and 2 not fully synchronized because the relative movement of the PLC frames is expected to be very slow as the clock deviation is very small.

1.9 Calculating Channel Capacity for Time Domain Approach

Using Shannon's law the channel capacity C within a time frame can be calculated according to the following formula (1):

$$C = \int_{t_{start}}^{t_{stop}} \int_{f_{start}}^{f_{stop}} ld(1 + SNR) df dt. \tag{1}$$

In a TD approach with a plurality of time gaps with respective starting times $t_{start,1}, \ldots, t_{start,n}$ and stopping times $t_{stop,1}, \ldots, t_{stop,n}$ and/or a FD approach with a plurality of frequency gaps with respective starting frequencies $f_{start,1}, \ldots, f_{start,m}$ and stopping frequencies $f_{stop,1}, \ldots, f_{stop,m}$ the full available channel capacity or channel capability is the sum of the respective partial channel capacities $C_{j,k}$.

In this case, a plurality of time gaps with respective starting times $t_{start,1}, \ldots, t_{start,n}$ and stopping times $t_{stop,1}, \ldots, t_{stop,n}$ fulfilling the conditions $t_{start,j} \leq t_{start,j+1}$, $t_{stop,j} \leq t_{stop,j+1}$, and $t_{start,j} < t_{stop,j}$ for $j=1, \ldots, n$ and/or for a plurality of frequency gaps with respective starting frequencies $f_{start,1}, \ldots, f_{start,m}$ and stopping frequencies $f_{stop,1}, \ldots, f_{stop,m}$ fulfilling the conditions $f_{start,k} \leq f_{start,k+1}$, $f_{stop,k} \leq f_{stop,k+1}$, and $f_{start,k} < f_{stop,k}$ for k=1, ..., m are given. The full channel capacity $C_{full}$ is then evaluated according to the following formula (2a):

$$C_{full} = \sum_{j=1}^{n} \sum_{k=1}^{m} C_{j,k} \quad (2a)$$

wherein $C_{jk}$ denotes the partial channel capacity for the $j^{th}$ time gap and the $k_{th}$ frequency gap and is determined according to Shannon's law and in particular according to the following formula (2b):

$$C_{j,k} = \int_{t_{start,j}}^{t_{stop,j}} \int_{f_{start,k}}^{f_{stop,k}} ld(1+SNR) df dt \quad (2b)$$

wherein t denotes the time variable for data transmission, f denotes the frequency variable, ld(·) denotes the dual logarithm function, and SNR denotes the respective signal-to-noise-ratio.

The signal-to-noise-ration SNR may be calculated a calculated according to the following formula (3):

$$SNR = PSD_{feed} - ATT - NPSD_{receive} \quad (3)$$

$PSD_{feed}$ is the feeding power spectral density and is known to all modems. $NPSD_{receive}$ is the noise power spectral density at the receiver and is measured by the receiving modem. ATT denotes the attenuation which is measured by a pair of PLC modems or PLC devices.

In Time Domain approach the full available frequency spectrum is used. The capability of a transmission is sum of capability of all time frames.

1.10 Freeing Useless Frequency Bands

All PLC systems must be able to detect noise on the Powerline network and to omit the disturbed frequencies from their communication by e.g. notching OFDM carriers. Only frequencies with good SNR shall be used for the communication. Other frequencies (with bad SNR) shall be omitted. The receiving modem measures the available SNR that becomes the reference for selecting the carriers for communication at the transmitter site.

In the example of FIG. 1 there is following an attenuation from P1 to P10 as is shown in FIG. 5. The transmitted signal has 0 dB attenuation at P1. At P10 the receiving signal is attenuated as shown in FIG. 5.

In the following these and further aspects of the present invention will be explained in more detail based on preferred embodiments of the present invention and by taking reference to the accompanying figures which schematically demonstrate aspects of the present invention. The red curve in FIG. 6 shows the attenuation from P15 to P10, which is identical to the interference to P10 caused by the communication between P15 and P21. The example in FIG. 6 shows a rare case, where the interference signals from outside are in meridian less attenuated than the signals from inside the Flat. Even under this constrains, there are some frequency ranges where the desired connection has less attenuation than the interfering signals.

At frequencies where the interfered signal is higher than the desired signal, e.g. 4 to 10 MHz, 13 to 16 MHz and 20 to 30 MHz, no communication is possible from P1 to P10. So these frequencies shall be omitted, without loosing any bit rate. After notching these frequencies the received signal looks like shown in FIG. 7.

The blue areas mark the SNR that can be used by the communication from P1 to P10. As a consequence the freed frequencies can be used by other adjacent PLC systems, e.g. PLC system in Flat 2. In case Flat 2 operates in the same way as the system in Flat 1 the communication from P15 to P21 could omit those frequencies used by flat 1. This offers an extended SNR for flat 1 and therefore higher bit rate (see FIG. 8).

If this coexistence mechanism is implemented to power line modems or devices, the dynamic notching for SW radio-protection is already included, because frequencies with low SNR caused by SW broadcast signals will be omitted.

1.11 Calculating the Channel Capacity for Frequency Domain Approach

Again, according Shannon's law shown in formula (1) the channel capacity C may be calculated. Here one or several frequency spans are used for the communication permanently.

1.12 Power Back Off

Similar behavior as described for the frequency domain can be applied to the transmitted power level in order to reduce the interference potentials.

For the possible calculation of the channel capability C according to formulas (1) and (2) the value of $PSD_{feed}$ is reduced, the full available spectrum is used permanently.

1.13 Device and Components View of the Invention's Embodiments

In FIG. 9 for an embodiment of an inventive receiving PLC partner device P10 an AFE or analog front end is comprised and the calculation of best amplitude, time and frequency span is novel in this invention when compared to the state of the art PLC modems today. The respective information may be send back to the transmitting modem or device.

In FIG. 10 for an embodiment of an inventive sending PLC partner device P1 the PSD or power spectral density is set and the transmitting modem or PLC device gets the information about best power settings, timing and frequency allocations. This information is forwarded to the modules in the MAC and physical layers MAC and PHY. The MAC layer MAC is responsible when the PLC modem or device P1 transmits data. The physical layer PHY places the notches or carriers of the OFDM transmission according to the best throughput conditions.

1.14 Conclusion

Some properties of state of the art communication technology are listed in the following:
1. Make use of coding together with time and frequency interleaving within a channel that is varying over time and frequency. Useful and efficient for fast changing channels
2. State of the art OFDM systems, e.g. wireless systems, do not use the benefits of quasi-static channels like PLC.
3. Allocating fixed frequency blocks for different users realizes coexistence.
4. Allocating fixed time slots for different users realizes coexistence (synchronized systems are needed).
5. Having enough distance to other users enables coexistence (strong attenuation between users)

Some possible properties of the new approach are listed in the following:
1. System may be realized adapt fast to changing channels. The overhead is only spend during the changes of the channel. This is efficient for quasi static channels.
2. Unused frequency blocks may become available for others.

3. Fully synchronized systems may be not required to make use of free time-slots.
4. System can make use of the specific channel conditions between nodes and external or outside interference.
5. The coexistence mechanism (Frequency Domain, Time Domain or Power Domain) that provides maximum channel capacity or channel capability shall be used for the communication.

BRIEF DESCRIPTION OF THE SEVERAL VIEWS OF THE DRAWINGS

These and further aspects of the present invention will be further discussed in the following based of preferred embodiments of the invention by taking reference to the accompanying and schematical figures.

DETAILED DESCRIPTION

In the following structural and/or functional elements which are comparable, similar or equivalent with respect to each other will be denoted by identical reference symbols. Not in each case of their occurrence a detailed description will be repeated.

Figure 1:
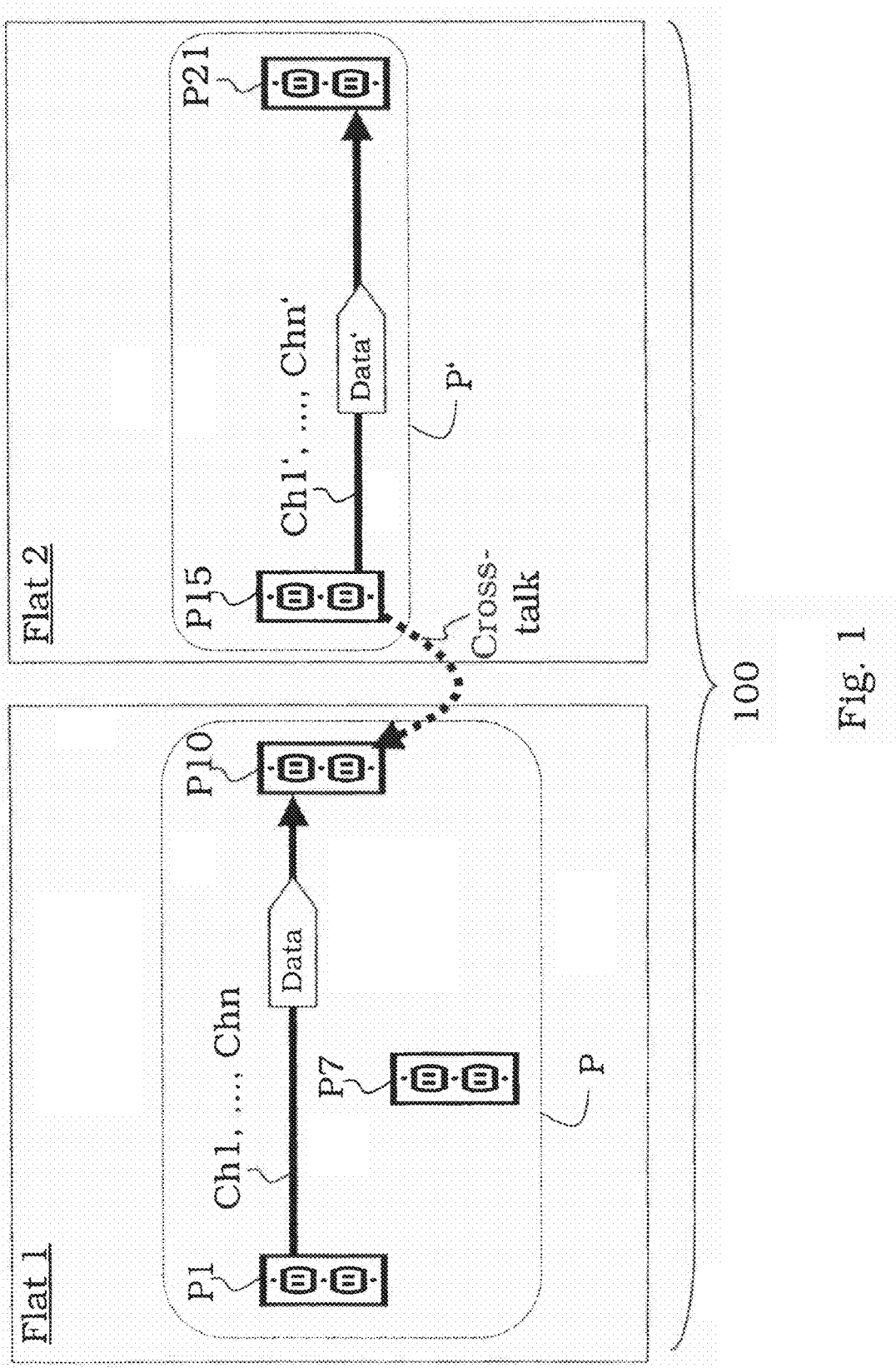
FIG. 1 is a schematical block diagram elucidating a communication environment which can be managed by the inventive method for power line communication.

FIG. 1 is a schematical block diagram elucidating a possible structure for a communication environment 100 to which an embodiment of the inventive power line communication method can be applied. Said a communication environment 100 can be referred to as a global network of devices which may by one means or another interact with each other.

The a communication environment 100 shown in FIG. 1 comprises a first power line communication system P which is situated in a first apartment of flat 1 and a second power line communication system P' which is situated in a second apartment of flat 2 which is spatially separated from said first apartment of flat 1.

The first power line communication system P comprises in the example shown in FIG. 1 three power line communication partner devices P1, P7, and P10. Between power line communication partner device P1 and power line communication partner device P10 a power line communication shall be established or is in progress which is indicated by the arrow pointing from the first or sending power line communication partner device P1 to the second or receiving power line communication partner device P10.

As on the other hand within the second power line communication system P' a communication between a sending power line communication partner device P15 and a receiving power line communication partner device P21 is in progress or shall be maintained which is indicated by the arrow pointing from power line communication partner device P15 to power line communication partner device P21 and interference or crossed for process or effect which is indicated by the doted arrow may take place by the sending power line communication partner device P15 of the second power line communication system P' to the receiving power line communication partner device P10 of the first power line communication system P.

The inventive method for power line communication is established in order to avoid the draw backs of cross-talk and interference in power line communication systems as shown in FIG. 1.

Figure 2:
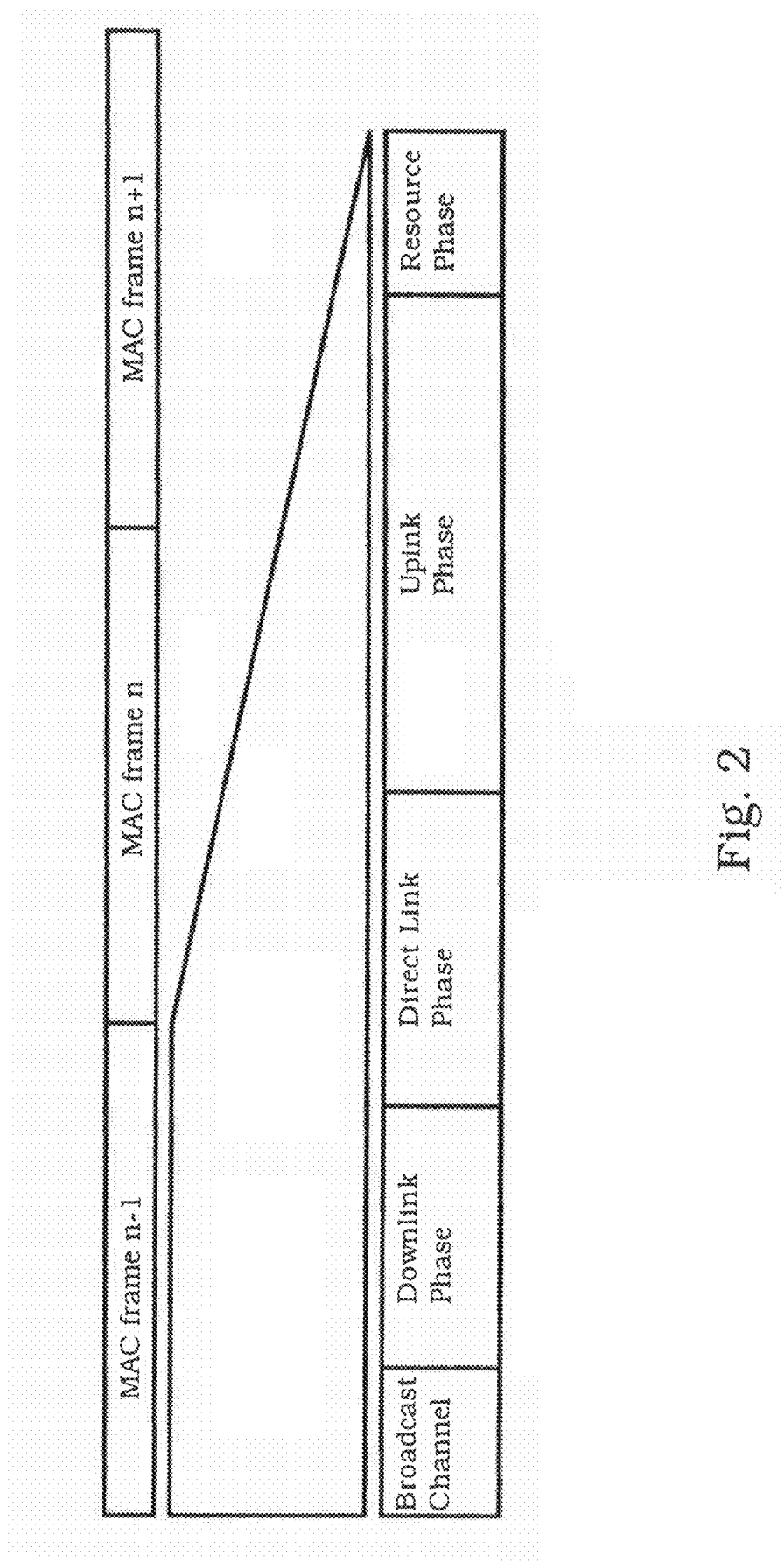
FIG. 2 is a schematical block diagram elucidating a typical MAC structure.
Figure 3:
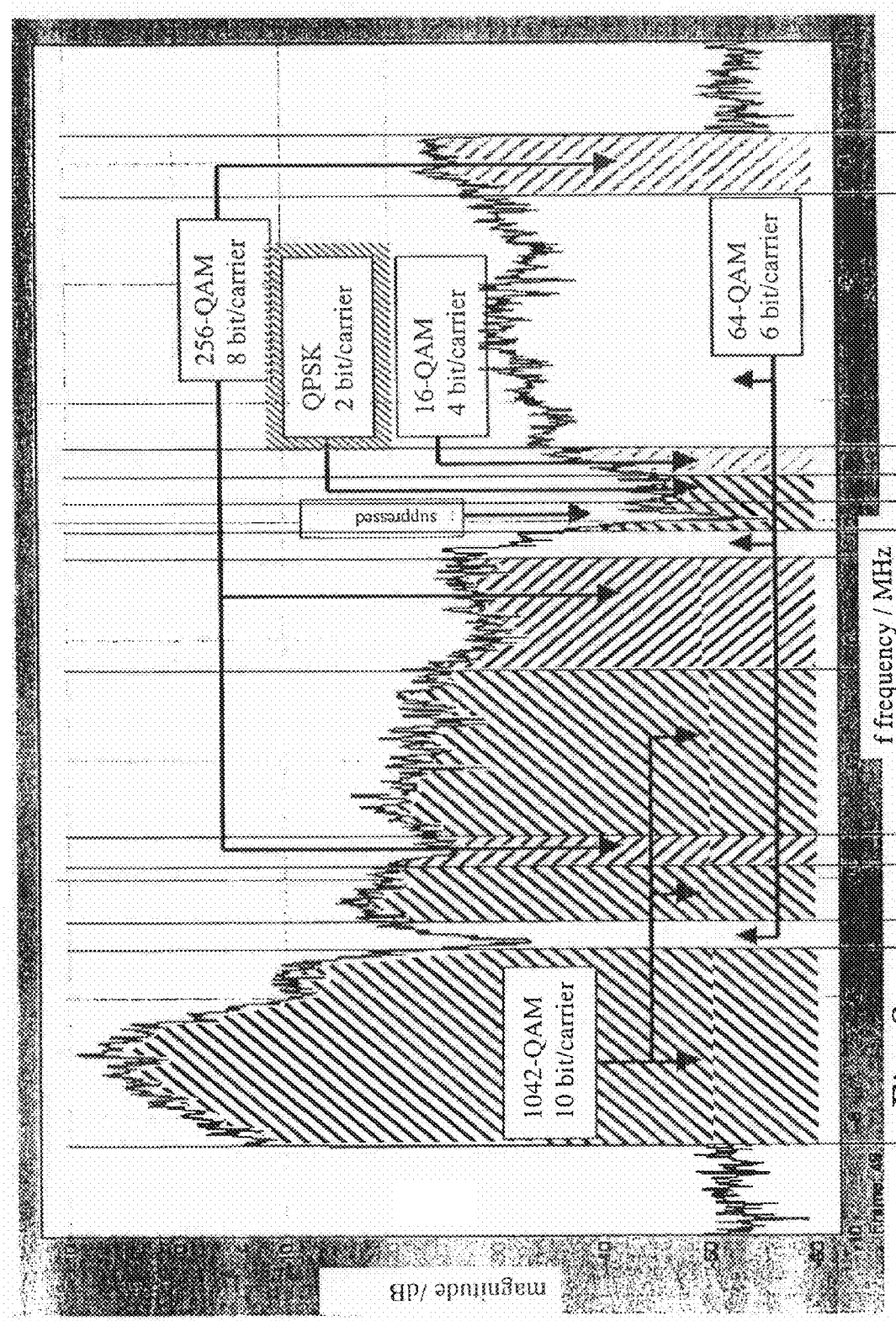
FIG. 3 is a diagram elucidating a possible signal-to-noise-ratio SNR in a power line communication channel and the selection of the constellation for each carrier.

FIG. 2 is a schematical block diagram of a MAC frame structure according to which power line communication between a first or sending power line communication partner device P1 and a second or receiving power line communication partner device P10 as shown in FIG. 1 can be realized. According to FIG. 2 the data to be communicated between interacting power line communication partner devices P1, P10 are transmitted within the structure of so-called MAC frames or media access control frames as shown in FIG. 2. The data is distributed within a concatenation of MAC frames, each of which are composed of five major sections, namely the broadcast channel section, a downlink face section, a direct link face section, an uplink face section, as well as a resource face section.

Figure 4:
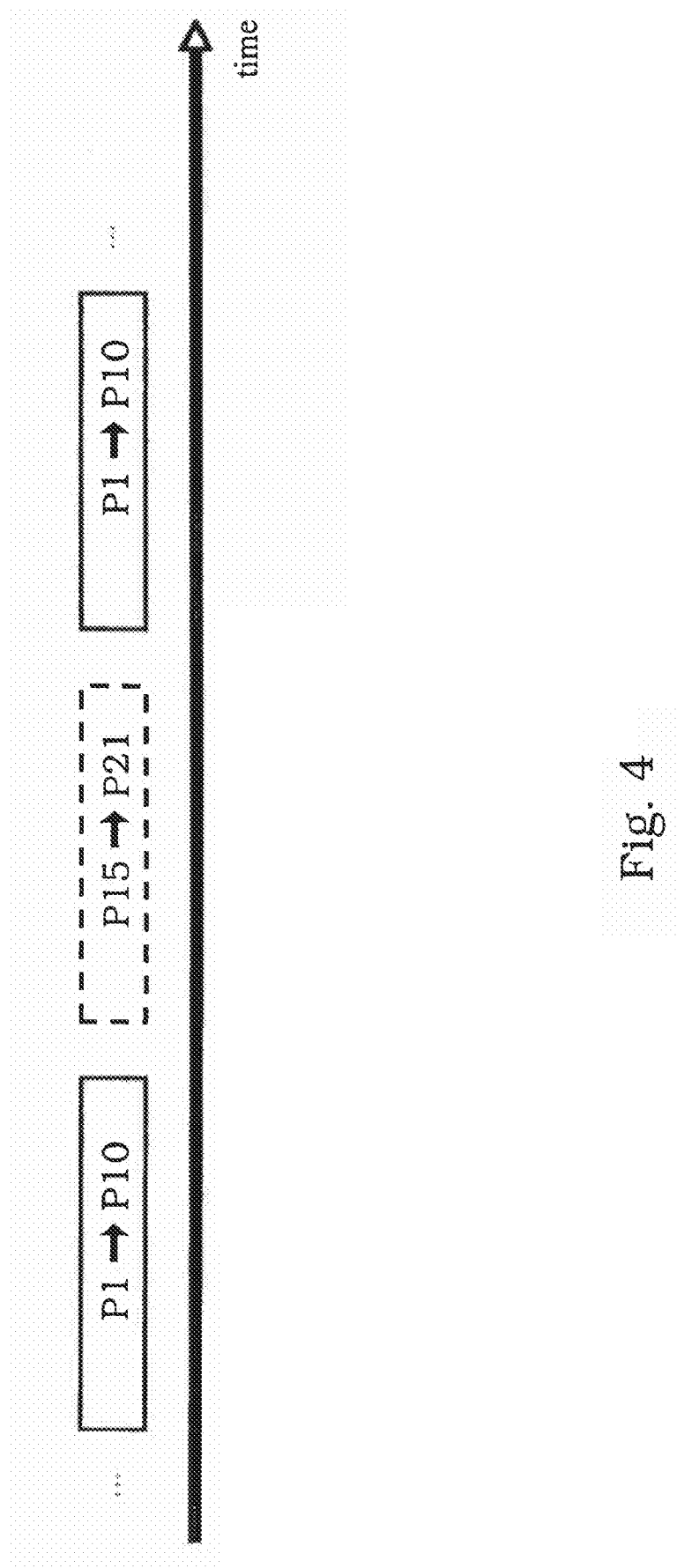
FIG. 4 is a schematical block diagram elucidating the time structure according to which the communication within a system of FIG. 1 can be established for TD coexistence approach aspects.

FIG. 4 is a schematical block diagram elucidating communication between power line communication partner devices P1, P10 on the one hand and P15, P21 on the other hand. The blocks with solid lines indicate data communication between the first or sending power line communication partner device P1 and the second or receiving power line communication partner device P10 of the first power line communication system P, whereas the dashed block indicates the data communication between the sending power line communication partner device P15 and the receiving power line communication partner device P21 of the second power line communication system P'. Each of the blocks correspond to respective time slots which are assigned to the respective pairs of power line communication partner devices P1, P10 and P15, P21 of said first and said second power line communication systems P, P' respectively, in order to avoid interference and cross-talk problems between said first and second system P, P'.

FIGS. 5 to 8 elucidate by means of graphical representations the transmission and receiving situations in said first and second power line communication systems P, P' shown in FIG. 1.

Figure 5:
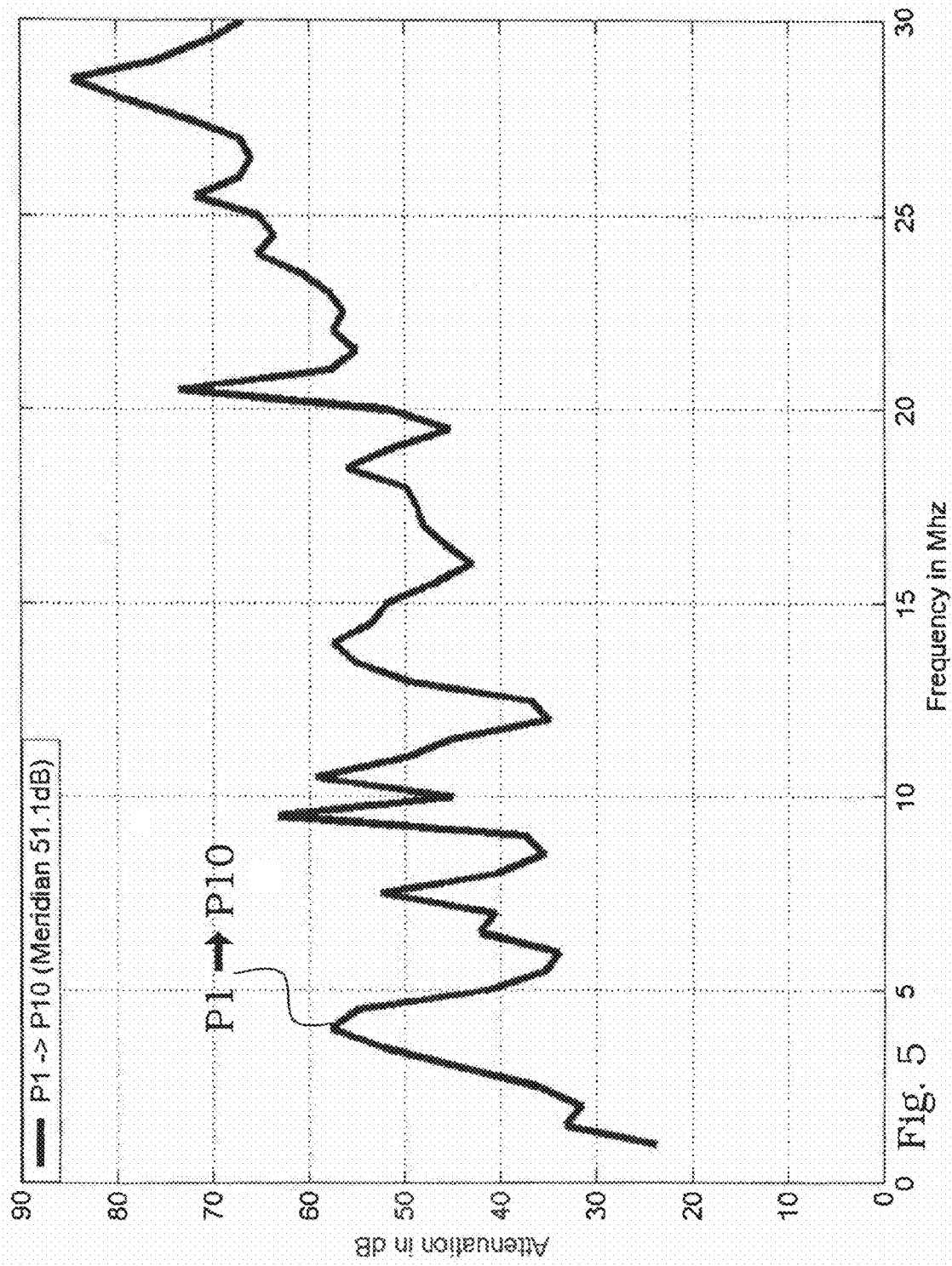
FIG. 5-8 are schematical graphical representations for elucidating aspects of communication conditions in a process of power line communication for FD coexistence approach aspects.

FIG. 5 elucidates the attenuation of a signal which is transmitted from said first or sending power line communication partner device P1 of said first power line communication system P to said second or receiving power line communication partner device P10 of said first power line communication system P. The trace of FIG. 5 describes the attenuation in dB as a function of frequency of the transmitted signal. Here the attenuation is measured at the location of the second power line communication partner device P10 of said first power line communication system P.

Figure 6:
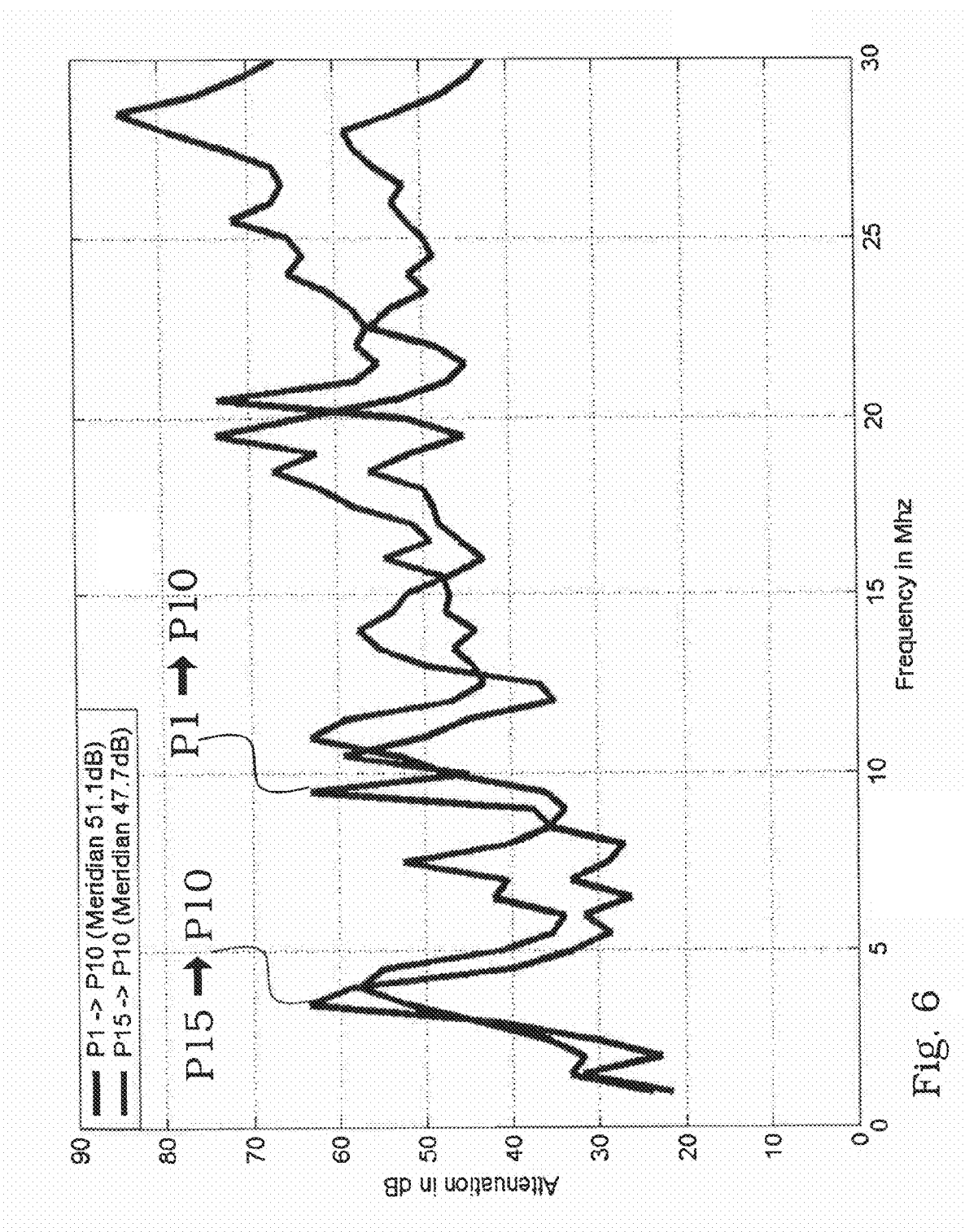

FIG. 6 includes as a additional trace the attenuation of a signal transmitted from the sending power line communication partner device P15 of the second power line communication system P' at the location of the second or receiving power line communication partner device P10 of the first power line communication system P. Obviously, there exist frequency bands in which the signal emitted from the sending power line communication partner device P15 of the second power line communication system P' is less attenuated at the location of the second or receiving power line communication partner device P10 of the first power line communication system P when compared to the attenuation of the signal emitted from the first or sending power line communication partner device P1 of said first power line communication system P. Therefore, there exists sections in the frequency spectrum where the interference or cross-talk signal has a superior signal strength over the data signal to be received by said second or receiving power line communication partner device P10 of the first power line communication system P.

Figure 7:
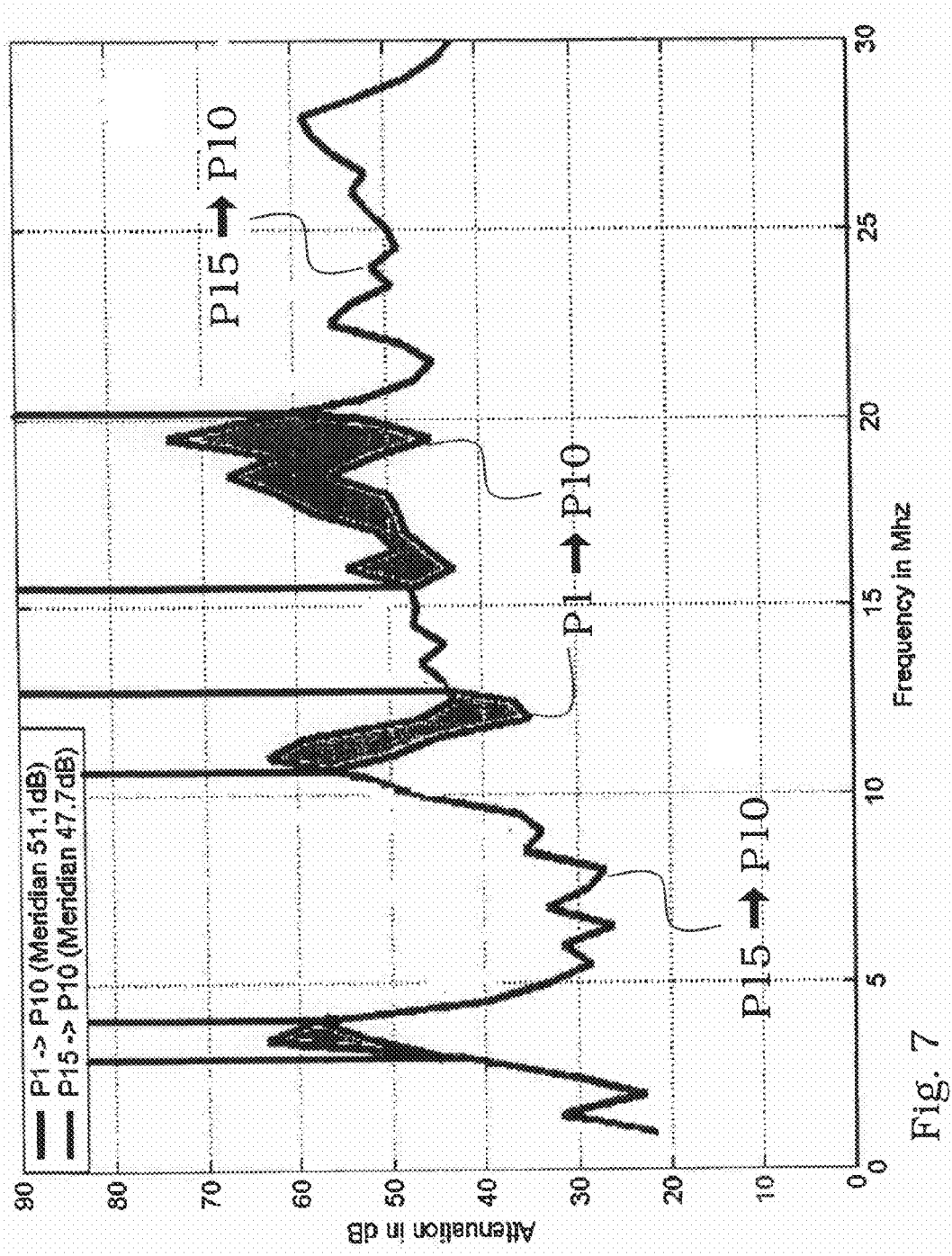

In FIG. 7 the frequency bands are emphasized and indicated at which the latter described situation is not given, i.e. the scattered sections are frequency sections at which the signal strength for the data signal transmitted from first or sending power line communication partner device P1 is larger than the signal interfered from the sending power line communication partner device P15 of the second power line communication system P' at the location of the second or receiving power line communication partner device P10 of said first power line communication system P.

Figure 8:
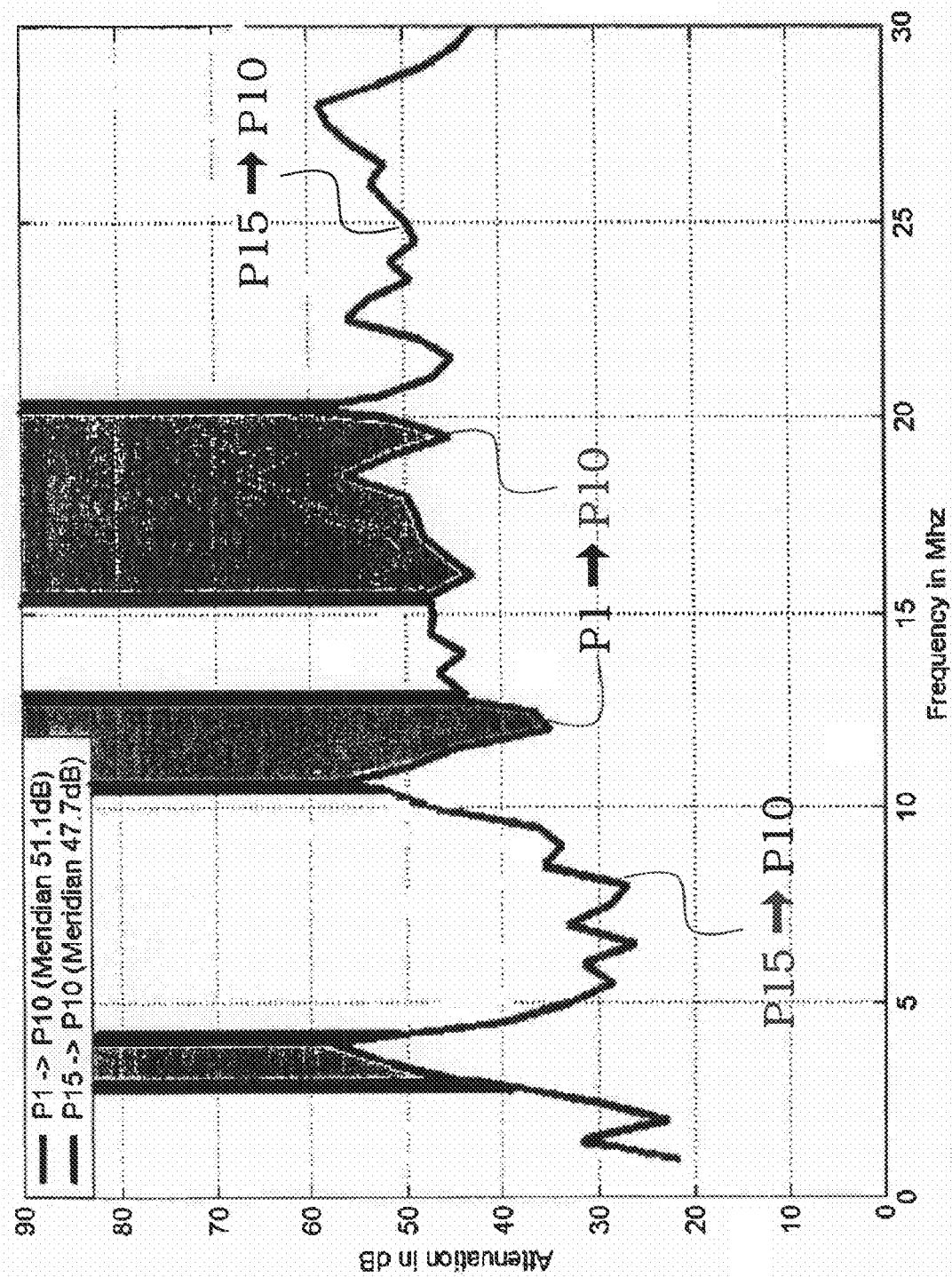
Figure 9:
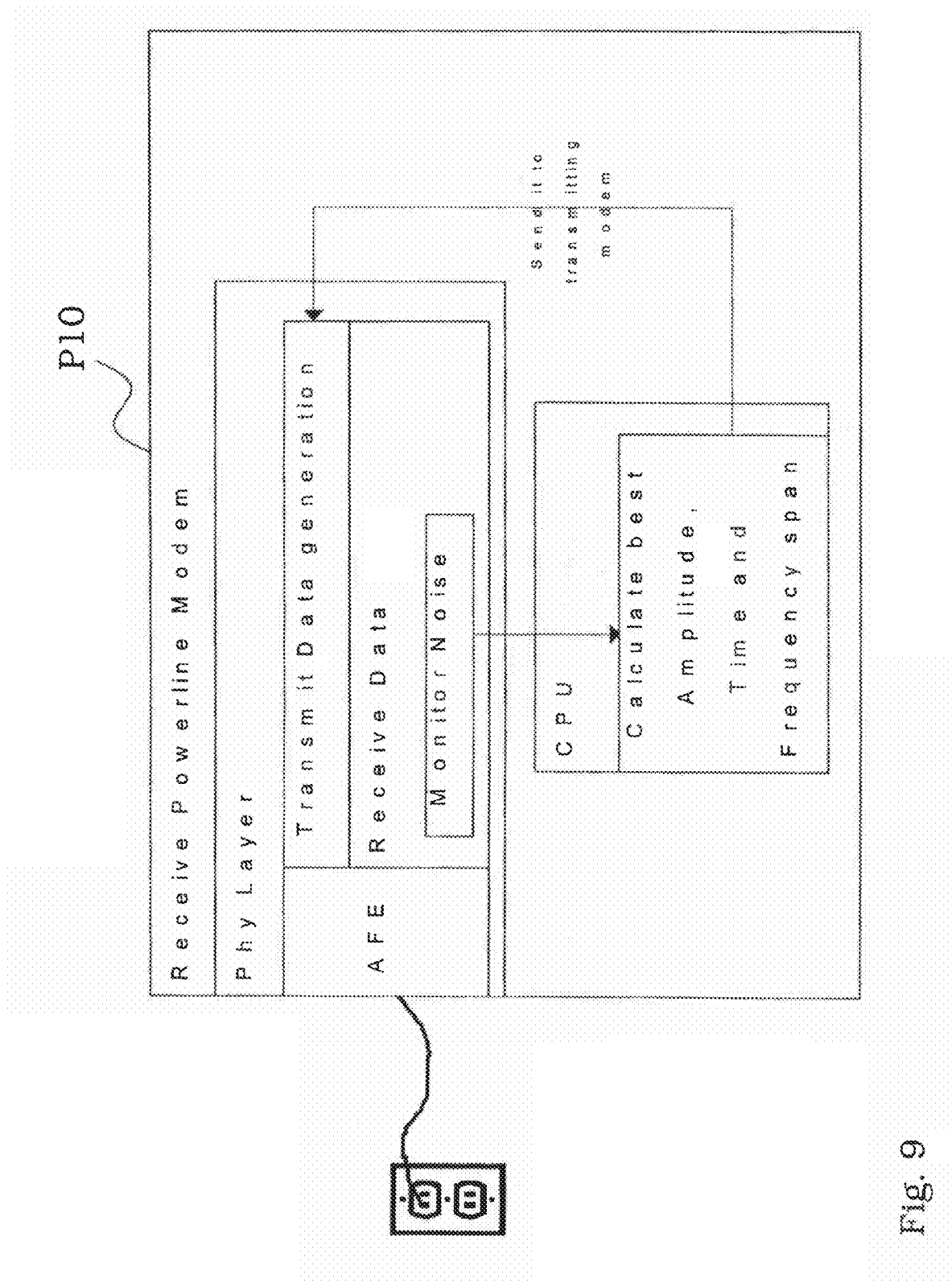
FIG. 9 is a schematical block diagram elucidating an embodiment of a receiving power line communication partner device.
Figure 10:
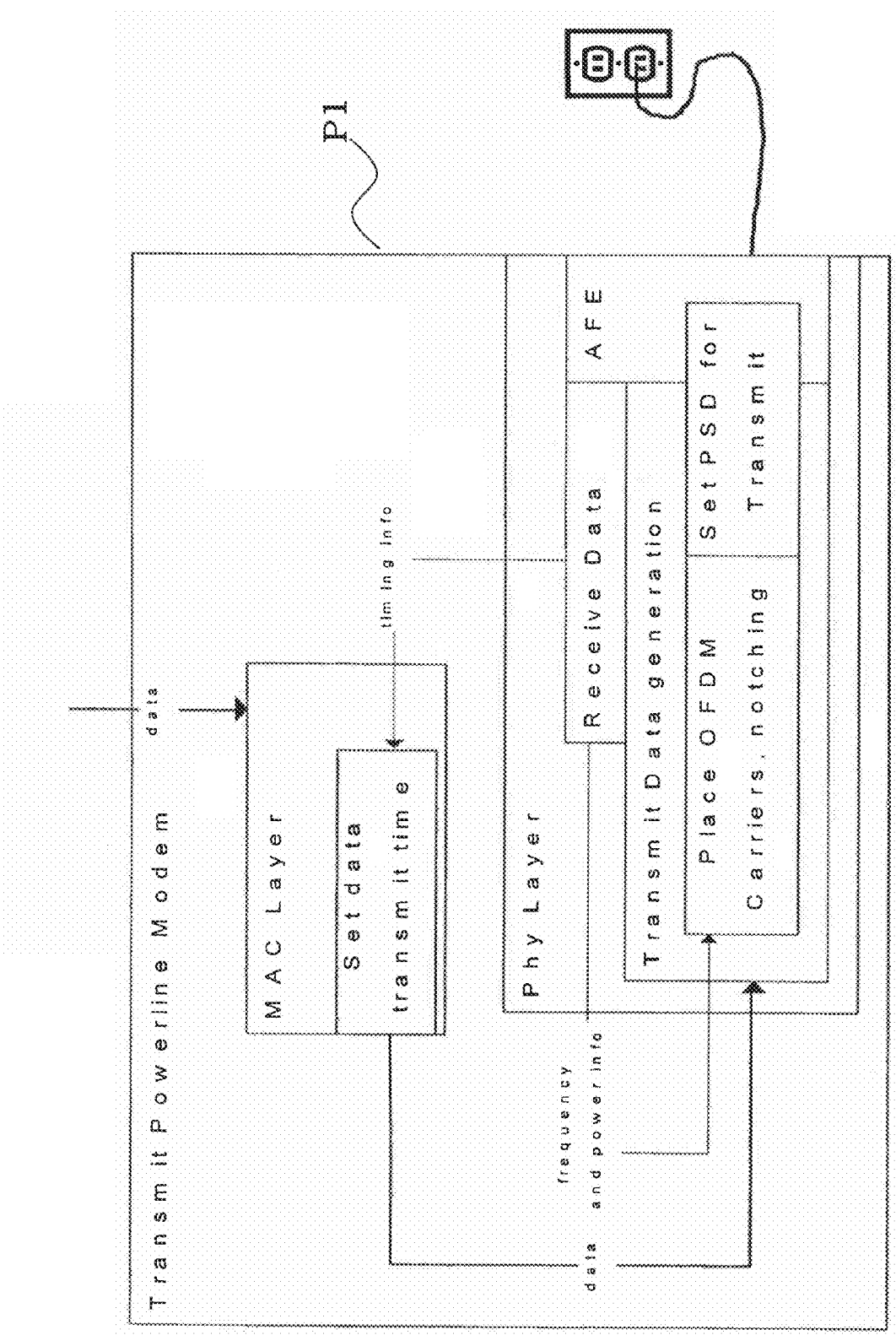
FIG. 10 is a schematical block diagram elucidating an embodiment of a sending or transmitting power line communication partner device.

FIG. 8 elucidates a situation in which the emphasized sections shown in FIG. 7 are freed from emissions of the sending power line communication partner device P15 of the second power line communication system P' in order to increase the signal-to-noise ratio at the respective frequency bands for the data signal transmission from said first or sending power line communication partner device P1 to said second or receiving power line communication partner device P10 of said first power line communication system P thereby increasing the possible communication band width and data throughput.

100 communication environment
Ch1, . . . , Chn Possible communication channels in $1^{st}$ PLC system P
Ch1', . . . , Chn' Possible communication channels in $2^{nd}$ PLC system P'
P first power line communication system
P' second power line communication system
P1 first or sending power line communication partner device
P7 power line communication partner device
P10 second or receiving power line communication partner device
P15 sending power line communication partner device
P21 receiving power line communication partner device

The invention claimed is:

1. A power line communication method for realizing data communication between at least one first or sending power line communication partner device and at least one second or receiving power line communication partner device of a power line communication system, comprising:
checking transmission conditions of a plurality of possible communication channels between said at least one first or sending power line communication partner device and said at least one second or receiving power line communication partner device;
generating transmission condition data which are descriptive for the transmission conditions of the respective possible communication channels; and
selecting communication conditions of the plurality of possible communication channels as actual communication conditions based on said transmission condition data between said at least one first or sending power line communication partner device and said at least one second or receiving power line communication partner device,
wherein the checking transmission conditions is based on checking interference signals from power line communication partner devices of said power line communication system and checking interference signals from power line communication partner devices of other power line communication systems interfering with said power line communication system.

2. The method according to claim 1, wherein said actual communication conditions are chosen in order to effect and select at least one of the group comprising a frequency band, a signal modulation scheme, a time slot and an emission power of a possible or said actual communication channel of the plurality of possible communication channels between said at least one first or sending power line communication partner device and said at least one second or receiving power line communication partner device.

3. The method according to claim 1, wherein said checking transmission conditions is carried out repeatedly.

4. The method according to claim 1, wherein said checking transmission conditions is carried out during a process of data communication in progress between said at least one first or sending power line communication partner device and said at least one second or receiving power line communication partner device.

5. The method according to claim 1, wherein said selecting said communication conditions is carried out repeatedly.

6. The method according to claim 1, wherein said selecting said communication conditions is carried out during a process of data communication and progress between said at least one first or sending power line communication partner device and said at least one second or receiving power line communication partner device, in order to change its communication conditions for maintaining or increasing the actual data communication quality of the data communication between said at least one first or sending power line communication partner device and said at least one second or receiving power line communication partner device in progress.

7. The method according to claim 1, wherein said actual communication conditions are chosen according to a given threshold criterion, in particular with respect to at least one of said transmission parameters.

8. The method according to claim 1, wherein said actual communication conditions are chosen in order to realize a best data communication, in particular with respect to a given threshold criterion, in particular with respect to at least one of said transmission parameters.

9. The method according to claim 1, wherein signal emission for data communication between said at least one first or sending power line communication partner device and said at least one second or receiving power line communication partner device is reduced or avoided by said at least one first or sending power line communication partner device for frequency bands in which said at least one second or receiving power lien communication partner device does not listen and/or in which foreign sending devices or noise are present.

10. The method according to claim 1, wherein signal emission power for data communication between said at least one first or sending power line communication partner device and said at least one second or receiving power line communication partner device is set in order to fulfil given emission power limit requirements with respect to chosen emission frequency bands.

11. The method according to claim 1, wherein data communication between said at least one first or sending power line communication partner device and said at least one second or receiving power line communication partner device is established according to a media access control or MAC structure.

12. The method according to claim 1, wherein a channel capacity is evaluated according to Shannon's law and in particular according to the following formula:

$$C = \int_{t_{start}}^{t_{stop}} \int_{f_{start}}^{f_{stop}} ld(1+SNR) df dt \quad (1)$$

wherein C denotes the channel capacity, t denotes the time variable for data transmission, $t_{start}$ denotes the starting time, $t_{stop}$ denotes the stopping time, f denotes the frequency variable, $f_{start}$ denotes the starting frequency, $f_{stop}$ denotes the stopping frequency, ld( ) denotes the dual logarithmic function, and SNR denotes the respective signal-to-noise-ratio.

13. The method according to claim 1, wherein for a plurality of time gaps with respective starting times $t_{start,1}, \ldots, t_{start,n}$ and stopping times $t_{stop,1}, \ldots, t_{stop,n}$ fulfilling the conditions $t_{start,j} \leq t_{start,j+1}$, $t_{stop,j} \leq t_{stop,j+1}$, and $t_{start,j} < t_{stop,j}$ for $j=1, \ldots, n$ and/or for a plurality of frequency gaps with respective starting frequencies $f_{start,1}, \ldots, f_{start,m}$ and stopping frequencies $f_{stop,1}, \ldots, f_{stop,m}$ fulfilling the conditions $f_{start,k} \leq f_{start,k+1}$, $f_{stop,k} \leq f_{stop,k+1}$, and $f_{start,k} < f_{stop,k}$ for $k=1, \ldots, m$ a full channel capacity $C_{full}$ is evaluated according to the following formula:

$$C_{full} = \sum_{j=1}^{n} \sum_{k=1}^{m} C_{j,k} \quad (2a)$$

wherein $C_{j,k}$ denotes the partial channel capacity for the $j^{th}$ time gap and the $k_{th}$ frequency gap and is determined according to Shannon's law and in particular according to the following formula:

$$C_{j,k} = \int_{t_{start,j}}^{t_{stop,j}} \int_{f_{start,k}}^{f_{stop,k}} ld(1+SNR) df dt \quad (2b)$$

wherein t denotes the time variable for data transmission, f denotes the frequency variable, ld( ) denotes the dual logarithmic function, and SNR denotes the respective signal-to-noise-ratio.

14. The method according to claim 1, wherein a signal to noise ratio (SNR) is determined according to the following formula:

$$SNR = PSD_{feed} - ATT - NPSD_{receive} \quad (3)$$

wherein SNR denotes the respective signal to noise ratio, $PSD_{feed}$ denotes the feeding power spectral density, which is in particular known to all modems, $NPSD_{receive}$ denotes the noise power spectral density at a receiver, which is in particular measured by the receiving power line communication partner device, and ATT denotes the attenuation of a signal, in particular between said first or sending power line communication partner device and said second or receiving power line communication partner device.

15. The method according to claim 1, wherein a plurality of power line communication systems as managed, in particular each having a plurality of power line communication partner devices and/or each without inter system communication between each of said systems of said plurality of power line communication systems.

16. A system, which is adapted and/or arranged and which has means in order to realize a method for power line communication according to claim 1.

17. A power line communication device which is adapted and/or arranged and which has means in order to realize and/or to participate in a method for power line communication according to claim 1.

18. A computer readable storage medium having embedded therein instructions, which when executed by a computer, cause the computer to perform a method according to claim 1.

* * * * *